(No Model.)

R. C. SMITH.
NUT LOCK.

No. 260,131.   Patented June 27, 1882.

WITNESSES
Wm A. Skinkle
Ernest Abshagen

INVENTOR
Richards C. Smith,
By his Attorneys
Baldwin Hopkins Peyton

UNITED STATES PATENT OFFICE.

RICHARDS C. SMITH, OF BALTIMORE, MARYLAND.

NUT-LOCK.

SPECIFICATION forming part of Letters Patent No. 260,131, dated June 27, 1882.

Application filed March 8, 1882. (No model.)

*To all whom it may concern:*

Be it known that I, RICHARDS C. SMITH, of the city of Baltimore, in the State of Maryland, have invented certain new and useful Improvements in Nut-Locks, of which the following is a specification.

My invention relates to improvements in that class of nut-locks in which are employed longitudinally - grooved bolts, with locking-pins engaging said grooves and recesses in the nuts.

My improvements will hereinafter be distinctly claimed.

Figure 2:
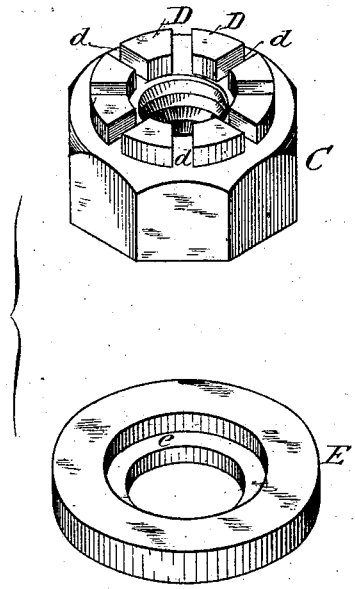
Figure 1:
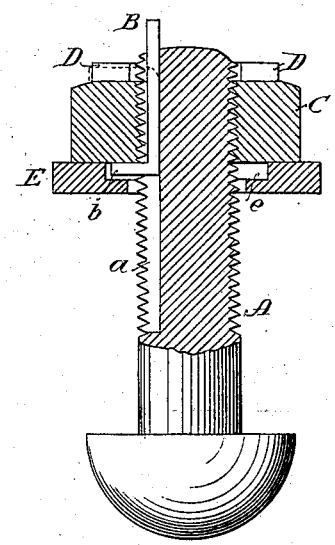
Figure 3:
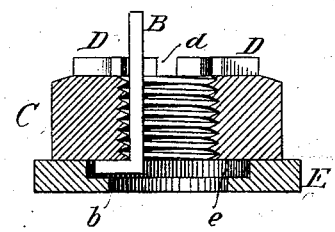

In the accompanying drawings, by the aid of which my improvements will be particularly pointed out, Figure 1 is a view partly in elevation and partly in longitudinal central section, showing a bolt and its nut, locking-pin, and recessed washer. Fig. 2 is a view in perspective of the nut and washer separated. Fig. 3 is a central sectional view, showing the nut, locking-pin, and washer.

The bolt A, having longitudinal groove $a$, the locking-pin B, having bent inner end or shoulder, $b$, and the nut C, provided with a series of radial notches or key-engaging recesses, $d$, offset from the outer face of the nut by being formed between the shoulders or projections D, are, with the single exception hereinafter noted, all the same as the bolt, nut, and locking-key shown in another application for Letters Patent of the United States filed by me simultaneously herewith, and are not herein claimed separately or in combination.

Instead of providing an annular recess surrounding the tap-hole of the nut on its inner face, as in the invention shown in my above-referred, to application, I employ an annularly-recessed washer, E, and so avoid weakening the nut. This washer, as clearly shown, is flat or disk-like, and formed with the shouldered annular cavity $e$ on its face next the nut, and surrounding and merging in the bolt-hole of the washer.

The head or bent inner end of the locking-key rests in the recess of the washer below the inner face of the nut when the parts are secured together. As the pin-head projects into the space provided for it between the inner face of the nut and the shoulder constituting the bottom of the washer-recess, endwise movement of the pin is prevented. The outer end of the key is locked with the nut by bending, as will readily be understood by inspection of the drawings.

It is obvious that instead of the locking-key engaging notches between offsets on the outer face of the nut, the usually-employed depressed recesses may be formed in the nut-face; but I prefer the construction shown for reasons fully explained in my above-mentioned application.

I claim as of my own invention—

.The combination of the grooved bolt, the locking-pin, the nut provided with recesses for engagement by the pin, and the washer having the recess around the bolt-hole to receive the shoulder at the inner end of the locking-pin, substantially as hereinbefore set forth.

In testimony whereof I have hereunto subscribed my name.

RICHARDS C. SMITH.

Witnesses:
GEO. MCCAFFRAY,
S. A. MORSE.